(12) United States Patent
Li et al.

(10) Patent No.: US 11,937,200 B2
(45) Date of Patent: Mar. 19, 2024

(54) EARPHONE SYNCHRONIZATION METHOD AND TRUE WIRELESS EARPHONE SYSTEM

(71) Applicant: Merry Electronics Co., Ltd., Taichung (TW)

(72) Inventors: Hung-Yuan Li, New Taipei (TW); Sasiraj So Somarajan, Taichung (TW)

(73) Assignee: Merry Electronics Co., Ltd., Taichung (TW)

( * ) Notice: Subject to any disclaimer, the term of this patent is extended or adjusted under 35 U.S.C. 154(b) by 169 days.

(21) Appl. No.: 17/701,687

(22) Filed: Mar. 23, 2022

(65) Prior Publication Data
US 2023/0254798 A1    Aug. 10, 2023

(30) Foreign Application Priority Data
Feb. 9, 2022 (TW) ................... 111104748

(51) Int. Cl.
*H04W 56/00* (2009.01)
*H04R 1/10* (2006.01)

(52) U.S. Cl.
CPC ........ *H04W 56/005* (2013.01); *H04R 1/1041* (2013.01); *H04R 2420/07* (2013.01)

(58) Field of Classification Search
CPC ...... H04R 1/10; H04R 2420/07; H04R 5/033; H04W 4/80; H04W 56/005
See application file for complete search history.

(56) References Cited

U.S. PATENT DOCUMENTS

| | | | | |
|---|---|---|---|---|
| 2019/0230459 A1* | 7/2019 | Sridharan | ................ | G06F 3/16 |
| 2020/0252993 A1* | 8/2020 | Srivastava | ........... | H04R 1/1016 |
| 2021/0119716 A1* | 4/2021 | Yang | .................. | H04W 56/005 |
| 2021/0400389 A1* | 12/2021 | Li | .......................... | H04L 65/60 |
| 2022/0141568 A1* | 5/2022 | Yan | ........................ | G06F 3/162 |
| | | | | 381/74 |
| 2022/0222063 A1* | 7/2022 | Bang | ........................ | G06F 8/65 |
| 2022/0353627 A1* | 11/2022 | Zhou | .................... | H04R 1/1016 |
| 2023/0048782 A1* | 2/2023 | Kondou | ................. | G10K 15/02 |
| 2023/0156403 A1* | 5/2023 | Pan | ......................... | H04S 7/304 |
| | | | | 381/311 |
| 2023/0217515 A1* | 7/2023 | Deng | ........................ | H04R 1/10 |
| | | | | 455/41.1 |

\* cited by examiner

*Primary Examiner* — Aristocratis Fotakis
(74) *Attorney, Agent, or Firm* — JCIPRNET

(57) ABSTRACT

The disclosure provides an earphone synchronization method and a true wireless earphone system. The method includes the following. A first packet is transmitted to a second wireless earphone. The first packet records a first packet transception time difference. A second packet is received from the second wireless earphone. The second packet records a second packet transception time difference. A synchronization state between a first wireless earphone and the second wireless earphone is obtained according to the first packet transception time difference and the second packet transception time difference. A play progress of playing a specific audio by the first wireless earphone or by the second wireless earphone is adaptively corrected according to the synchronization state between the first wireless earphone and the second wireless earphone.

12 Claims, 3 Drawing Sheets

EARPHONE SYNCHRONIZATION METHOD AND TRUE WIRELESS EARPHONE SYSTEM

CROSS-REFERENCE TO RELATED APPLICATION

This application claims the priority benefit of Taiwanese application no. 111104748, filed on Feb. 9, 2022. The entirety of the above-mentioned patent application is hereby incorporated by reference herein and made a part of this specification.

BACKGROUND

Technical Field

The disclosure relates to an earphone operating mechanism. In particular, the disclosure relates to a true wireless earphone system and an earphone synchronization method.

Description of Related Art

To help people fall asleep, a true wireless earphone system commonly referred to as sleep coach has appeared on the market currently. This true wireless earphone system may include a master earphone and a slave earphone. The two earphones may store several pieces of music/sound effects that may be used to help a user fall asleep, and may also play the music/sound effects for the user to listen to.

Conventionally, the two earphones play music/sound effects based on their respective built-in system clocks. At the beginning of playing the music/sound effects, since the system clocks of the two earphones can be synchronized with each other, the two earphones can play synchronously, and non-synchronicity between the music/sound effects from two ears is thus not perceived by the user. However, as the playing time increases, failure of synchronous playing between the two earphones may gradually be exhibited for reasons such as clock drift, thus affecting experiences of the user.

For those skilled in the related fields, how to design a mechanism that restores synchronization between the two earphones being not able to know the clock offset between them is an important issue.

SUMMARY

The disclosure provides a true wireless earphone system and an earphone synchronization method.

According to an embodiment of the disclosure, a true wireless earphone system includes a first wireless earphone. The first wireless earphone is configured to, during an $i^{th}$ period: send a first packet to a second wireless earphone; receive a second packet from the second wireless earphone; obtain a synchronization state between the first wireless earphone and the second wireless earphone according to a first packet transception time difference and a second packet transception time difference; and adaptively correct a play progress of playing a specific audio by the first wireless earphone or by the second wireless earphone according to the synchronization state between the first wireless earphone and the second wireless earphone, where i is an index value. The first packet records the first packet transception time difference measured by the first wireless earphone during an $i-1^{th}$ period. The second packet records the second packet transception time difference measured by the second wireless earphone during the $i-1^{th}$ period.

According to an embodiment of the disclosure, an earphone synchronization method is adapted for a true wireless earphone system. The true wireless earphone system includes a first wireless earphone. The method includes the following. A first packet is transmitted to a second wireless earphone by the first wireless earphone during an $i^{th}$ period, where i is an index value. The first packet records a first packet transception time difference measured by the first wireless earphone during an $i-1^{th}$ period. A second packet is received from the second wireless earphone by the first wireless earphone during the $i^{th}$ period. The second packet records a second packet transception time difference measured by the second wireless earphone during the $i-1^{th}$ period. A synchronization state between the first wireless earphone and the second wireless earphone is obtained by the first wireless earphone according to the first packet transception time difference and the second packet transception time difference. A play progress of playing a specific audio by the first wireless earphone or by the second wireless earphone is adaptively corrected by the first wireless earphone according to the synchronization state between the first wireless earphone and the second wireless earphone.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
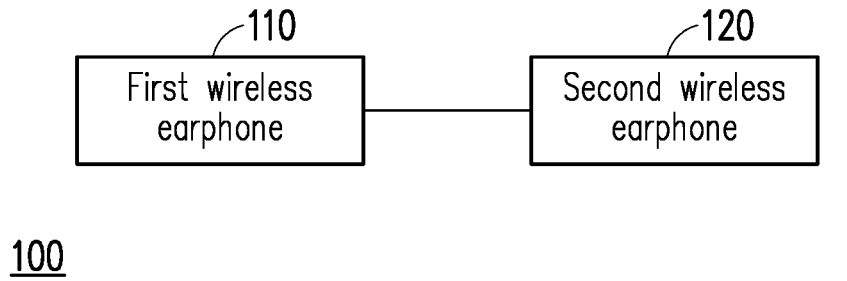
FIG. 1 is a schematic diagram of a true wireless earphone system according to an embodiment of the disclosure.

With reference to FIG. 1, FIG. 1 is a schematic diagram of a true wireless earphone system according to an embodiment of the disclosure. In FIG. 1, a true wireless earphone system 100 includes a first wireless earphone 110 and a second wireless earphone 120. In an embodiment, for example, one of the first wireless earphone 110 and the second wireless earphone 120 is a master earphone, and the other is a slave earphone controlled by the master earphone. In an embodiment, the true wireless earphone system 100 may also include a charging case. The charging case may be provided with an accommodating space corresponding to the first wireless earphone 110 and the second wireless earphone 120. In an embodiment, when the first wireless earphone 110 and the second wireless earphone 120 are placed in the corresponding accommodating space in the charging case, the charging case may charge and/or power off the first wireless earphone 110 and the second wireless earphone 120, but not limited thereto.

In an embodiment, the first wireless earphone 110 and the second wireless earphone 120 may exchange data with each other through a specific communication protocol, and the first wireless earphone 110 and the second wireless earphone 120 may be individually provided with a communication circuit corresponding to the communication protocol (which may, for example, include a radio frequency front end circuit or other communication elements required for data exchange).

In an embodiment of the disclosure, the master earphone and the slave earphone of the true wireless earphone system 100 may exchange data via the Bluetooth low energy (BLE) protocol, and the first wireless earphone 110 and the second wireless earphone 120 may be individually provided with related Bluetooth communication circuits/modules. In an embodiment, the master earphone may transmit a data packet to the slave earphone, and the slave earphone may transmit an acknowledgement (ACK) message or a negative acknowledgement (NAK) message back to the master earphone according to the circumstances of receiving the data packet.

In an embodiment that adopts the BLE protocol for data exchange, the data packet transmitted by the master earphone may, for example, include parts such as preamble, address, header, payload, and cyclic redundancy check (CRC) code. For the definition/content of each part, reference may be made to relevant specifications of BLE, and the details will not be described in repetition here.

In other embodiments, the master earphone and the slave earphone may also exchange data through other communication protocols (e.g., Wifi). The content of the data packet may also be determined in response to the relevant specification of the selected communication protocol.

In an embodiment of the disclosure, the true wireless earphone system 100 may, for example, independently provide music/sound effects for the user to listen to without pairing with other devices (e.g., various smart devices/computers, etc.). In an embodiment, the first wireless earphone 110 and the second wireless earphone 120 may each store several pieces of music/sound effects to be played for the user to listen to. In other words, in some embodiments, the music/sound effects played by the true wireless earphone system 100 may not be required to come from other external devices, and may be provided by the first wireless earphone 110 and the second wireless earphone 120, but not limited thereto.

In an embodiment of the disclosure, the first wireless earphone 110 and the second wireless earphone 120 may individually include a storage circuit and a processor. In different embodiments, the storage circuit is, for example, any form of fixed or removable random access memory (RAM), read-only memory (ROM), flash memory, a hard disk, or other similar devices or a combination of these devices, and may be configured to record multiple programming codes or modules.

In addition, the processor may be coupled to the storage circuit, and may be a general-purpose processor, a special-purpose processor, a traditional processor, a digital signal processor, multiple microprocessors, one or more microprocessors combined with a digital signal processor core, a controller, a microcontroller, an application specific integrated circuit (ASIC), a field programmable gate array (FPGA), any other kind of integrated circuit, a state machine, an advanced RISC machine (ARM) processor, and the like.

Roughly speaking, in an embodiment of the disclosure, the master earphone may transmit data packets to the slave earphone two times during each period (the length of which is 10 ms, for example), and the slave earphone may accordingly transmit corresponding acknowledgement messages back to the master earphone. The data packets and the acknowledgement messages may respectively include information measured by the master earphone and by the slave earphone during the previous period. After that, the master earphone and/or the slave earphone may adaptively adjust synchronization with each other according to the information. The relevant details will be further described later.

In an embodiment of the disclosure, the processor of the first wireless earphone 110 may access the modules and programming codes recorded in the storage circuit to realize an earphone synchronization method provided by the disclosure, specifics of which are described in detail below.

Figure 2:
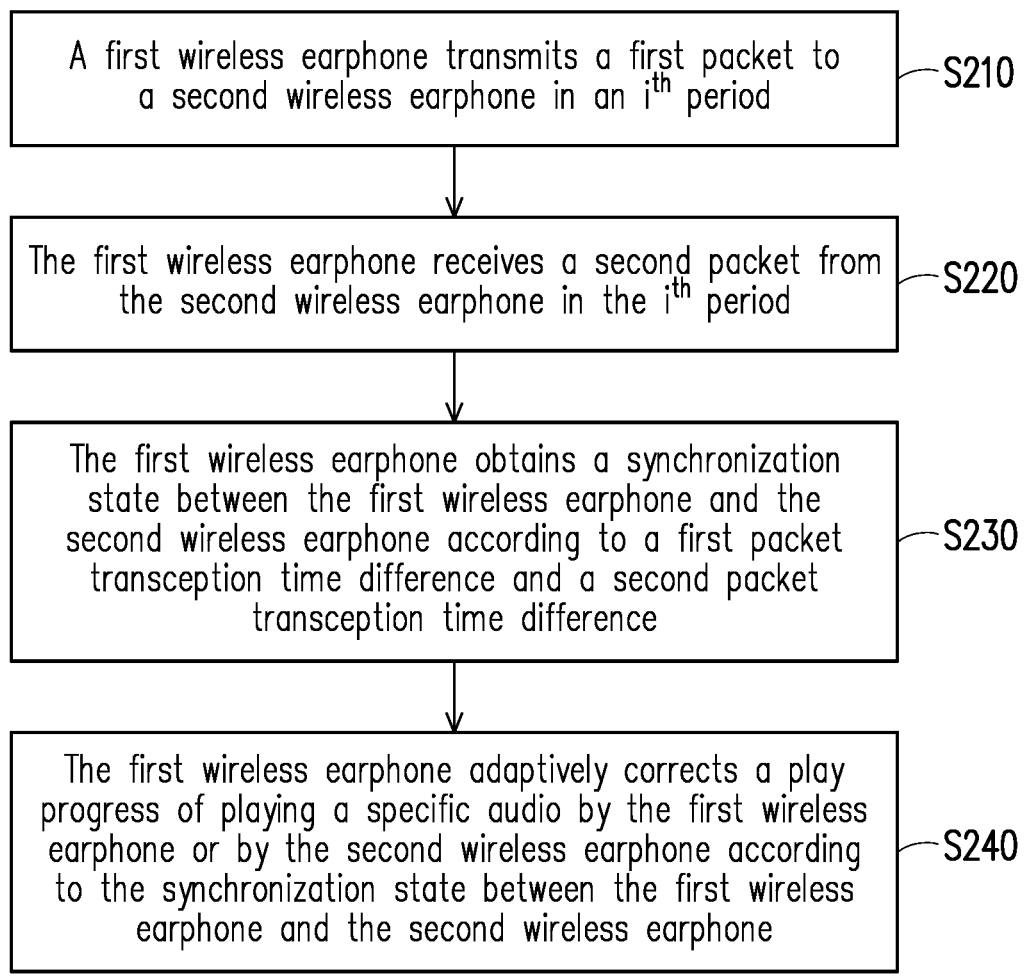
FIG. 2 is a flowchart of an earphone synchronization method according to an embodiment of the disclosure.
Figure 3A:
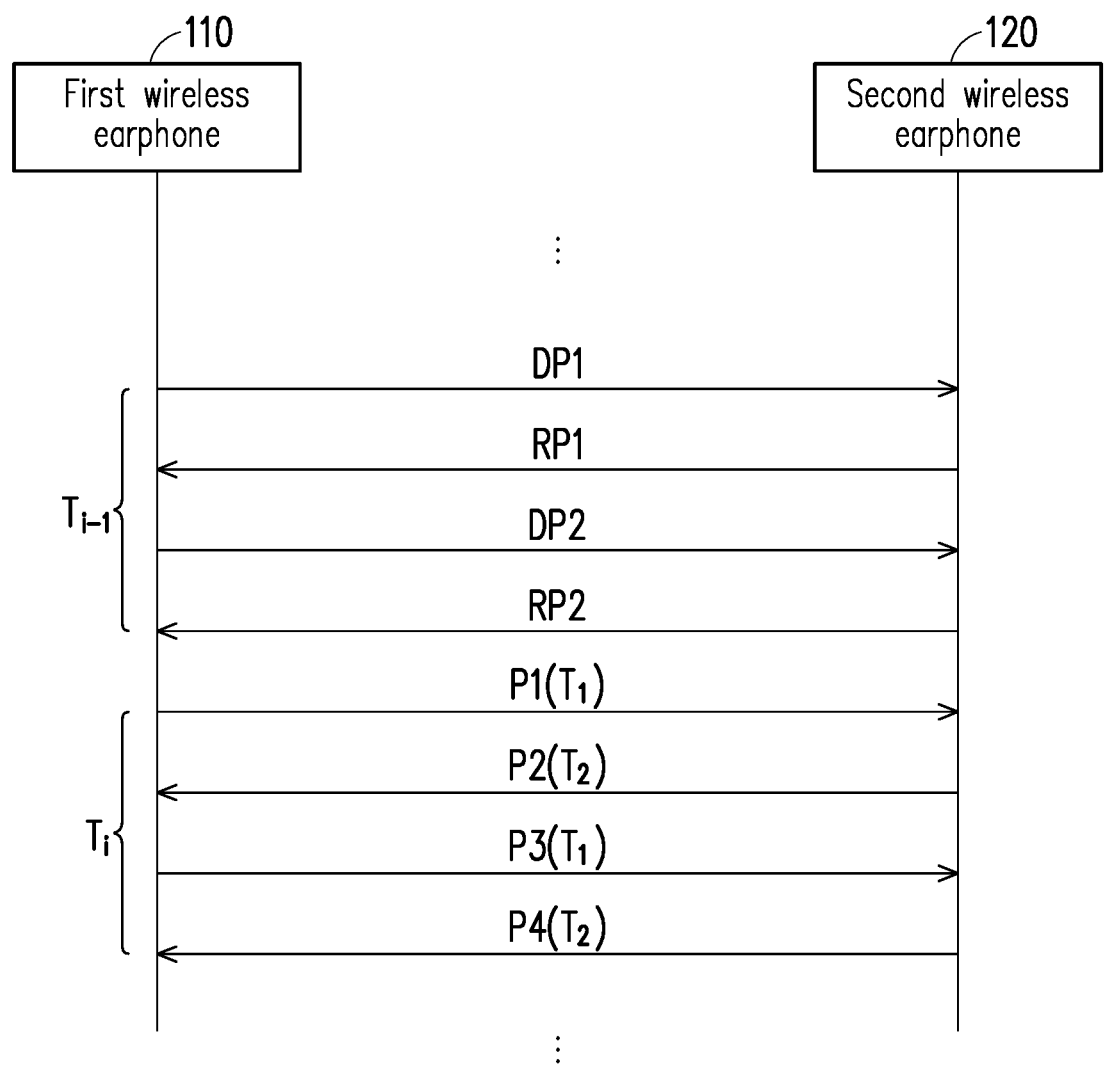
FIG. 3A is a diagram showing signal timings according to an embodiment of the disclosure.
Figure 3B:
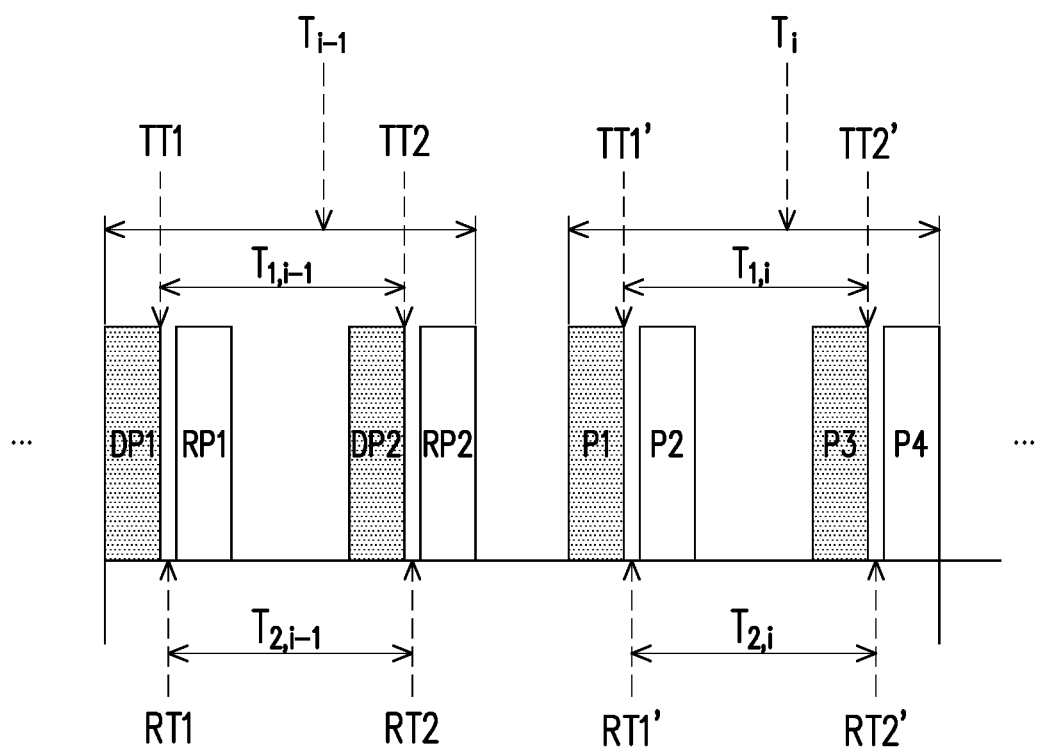
FIG. 3B is a diagram showing an application scenario according to FIG. 3A.

With reference to FIG. 2, FIG. 2 is a flowchart of an earphone synchronization method according to an embodiment of the disclosure. The method of this embodiment may be performed by the first wireless earphone 110 of FIG. 1. Details of each step of FIG. 2 accompanied with the elements shown in FIG. 1 will be described below. In addition, in order to make the concept of the disclosure more comprehensible, the following description will be supplemented by FIG. 3A and FIG. 3B. FIG. 3A is a diagram showing signal timings according to an embodiment of the disclosure. FIG. 3B is a diagram showing an application scenario according to FIG. 3A.

In an embodiment, the first wireless earphone 110 is, for example, the master earphone in the true wireless earphone system 100, and the second wireless earphone 120 is, for example, the slave earphone in the true wireless earphone system 100.

Based on this, during an i-1$^{th}$ period (represented by a period $T_{i-1}$ (where i is an index value) of an embodiment, the first wireless earphone 110 may transmit a first data packet DP1 to the second wireless earphone 120, and record a first transmission completion time TT1 of the first data packet DP1.

In an embodiment, the radio frequency front end circuit of the first wireless earphone 110 may provide a first transmission interruption signal upon completion of the transmission of the first data packet DP1. The first wireless earphone 110 may determine the first transmission completion time TT1 of the first data packet DP1 based on a first interruption time point corresponding to the first transmission interruption signal of the first data packet DP1. Nonetheless, the disclosure is not limited thereto.

Accordingly, the second wireless earphone 120 may receive the first data packet DP1 from the first wireless earphone 110, and record a first reception completion time RT1 of the first data packet DP1.

In an embodiment, the radio frequency front end circuit of the second wireless earphone 120 may provide a first reception interruption signal upon completion of reception of the first data packet DP1. The second wireless earphone 120 may determine the first reception completion time RT1 of the first data packet DP1 based on a third interruption time point corresponding to the first reception interruption signal of the first data packet DP1. Nonetheless, the disclosure is not limited thereto.

In addition, the second wireless earphone 120 may also transmit an acknowledgement message RP1 corresponding to the first data packet DP1 back to the first wireless earphone 110.

After that, during the period $T_{i-1}$ in an embodiment, the first wireless earphone 110 may also transmit a second data packet DP2 to the second wireless earphone 120, and record a second transmission completion time TT2 of the second data packet DP2.

In an embodiment, the radio frequency front end circuit of the first wireless earphone 110 may provide a second transmission interruption signal upon completion of the transmission of the second data packet DP2. The first wireless earphone 110 may determine the second transmission completion time TT2 of the second data packet DP2 based on a second interruption time point corresponding to the second transmission interruption signal of the second data packet DP2. Nonetheless, the disclosure is not limited thereto.

Moreover, the first wireless earphone 110 may obtain a transmission time difference $T_{1,i-1}$ between the first transmission completion time TT1 and the second transmission completion time TT2, and accumulate the transmission time difference $T_{1,i-1}$ to a first accumulated time (represented by AT1).

In an embodiment, the first wireless earphone 110 may be provided with a first counter, which may accumulate the first accumulated time AT1 based on a first system clock in the first wireless earphone 110, but not limited thereto. In an embodiment, the first counter may, for example, be incremented by 1 per microsecond in response to the first system clock, but not limited thereto.

Accordingly, the second wireless earphone 120 may receive the second data packet DP2 from the first wireless earphone 110, and record a second reception completion time RT2 of the second data packet DP2.

In an embodiment, the radio frequency front end circuit of the second wireless earphone 120 may provide a second reception interruption signal upon completion of reception of the second data packet DP2. The second wireless earphone 120 may determine the second reception completion time RT2 of the second data packet DP2 based on a fourth interruption time point corresponding to the second reception interruption signal of the second data packet DP2. Nonetheless, the disclosure is not limited thereto.

In addition, the second wireless earphone 120 may also transmit an acknowledgement message RP2 corresponding to the second data packet DP2 back to the first wireless earphone 110. Moreover, the second wireless earphone 120 may obtain a reception time difference $T_{2,i-1}$ between the first reception completion time RT1 and the second reception completion time RT2, and accumulate the reception time difference $T_{2,i-1}$ to a second accumulated time (represented by AT2).

In an embodiment, the second wireless earphone 120 may be provided with a second counter, which may accumulate the second accumulated time AT2 based on a second system clock in the second wireless earphone 120 (which may have the same frequency with the first system clock), but not limited thereto. In an embodiment, the second counter may, for example, be incremented by 1 per microsecond in response to the second system clock, but not limited thereto.

In an embodiment, the first accumulated time AT1 may, for example, be accumulated from the transmission time difference(s) corresponding to the previous one or more periods, and the second accumulated time AT2 may, for example, be accumulated from the reception time difference(s) corresponding to the previous one or more periods. Nonetheless, the disclosure is not limited thereto. In an embodiment, if the first wireless earphone 110 and the second wireless earphone 120 are still in synchronization, the first accumulated time AT1 should be approximate to the second accumulated time AT2. However, when the synchronization between the first wireless earphone 110 and the second wireless earphone 120 is gradually lost for reasons such as clock drift, the difference between the first accumulated time AT1 and the second accumulated time AT2 may also be increased accordingly.

Based on this, after obtaining the first accumulated time AT1 or the second accumulated time AT2 provided by each other, the first wireless earphone 110 and the second wireless earphone 120 may accordingly determine whether the synchronization between each other has been lost, and may perform a corresponding synchronization correction operation. The relevant details will be described later.

In an embodiment, the first wireless earphone 110 may provide the obtained first accumulated time AT1 to the second wireless earphone 120 through the corresponding data packet during the next period (i.e., an $i^{th}$ period, represented by a period $T_i$). Similarly, the second wireless earphone 120 may provide the obtained second accumulated time AT2 to the first wireless earphone 110 through the corresponding acknowledgement message during the next period (i.e., the period $T_i$).

Based on this, in step S210, the first wireless earphone 110 transmits a first packet P1 to the second wireless earphone 120 during the $i^{th}$ period (i.e., the period $T_i$). The first packet P1 records a first packet transception time difference T1 measured by the first wireless earphone 110 during the i–1$^{th}$ period (i.e., the period $T_{i-1}$).

In an embodiment, since the first wireless earphone 110 is assumed to be the master earphone, the first packet P1 is, for example, a data packet transmitted from the first wireless earphone 110. In this case, the first wireless earphone 110 may, for example, take the first accumulated time AT1 as the first packet transception time difference T1 in the first packet P1, and inform the second wireless earphone 120 of the first packet transception time difference T1 (i.e., the first accumulated time AT1) through the first packet P1.

In an embodiment, the first wireless earphone 110 may, for example, take the first packet transception time difference T1 as a payload in the first packet P1 to be transmitted to the second wireless earphone 120, but not limited thereto. In addition, during the process of transmitting the first packet P1 by the first wireless earphone 110, the first wireless earphone 110 may also record a first transmission completion time TT1' of the first packet P1.

In an embodiment, after receiving the first packet P1, the second wireless earphone 120 may obtain the first packet transception time difference T1 from the first packet P1 to accordingly know the first accumulated time AT1. In addition, during the process of receiving the first packet P1 by the second wireless earphone 120, the second wireless earphone 120 may also record a first reception completion time RT1' of the first packet P1. After that, the second wireless earphone 120 may transmit a second packet P2 corresponding to the first packet P1 back to the first wireless earphone 110.

In an embodiment, since the second wireless earphone 120 is assumed to be the slave earphone, the second packet P2 transmitted by the second wireless earphone 120 is, for example, an acknowledgement message corresponding to the first packet P1, and may record a second packet transception time difference T2 measured by the second wireless earphone 120 during the i–1$^{th}$ period (i.e., the period $T_{i-1}$).

In an embodiment, the second wireless earphone 120 may take the second accumulated time AT2 as the second packet transception time difference T2 in the second packet P2.

Accordingly, in step S220, the first wireless earphone 110 receives the second packet P2 from the second wireless earphone 120 during the $i^{th}$ period (i.e., the period T1). In this case, the first wireless earphone 110 may obtain the second packet transception time difference T2 (i.e., the second accumulated time AT2) provided by the second wireless earphone 120 from the second packet P2.

After that, in step S230, the first wireless earphone 110 obtains a synchronization state between the first wireless earphone 110 and the second wireless earphone 120 according to the first packet transception time difference T1 (i.e., the first accumulated time AT1) and the second packet transception time difference T2 (i.e., the second accumulated time AT2).

In an embodiment, the first wireless earphone 110 (i.e., the master earphone) may obtain an absolute time difference (represented by TD) between the first packet transception time difference T1 and the second packet transception time difference T2, and determine whether the absolute time difference TD is greater than a threshold value (represented by $T_{TH}$). In different embodiments, the threshold value may be set to any value sufficient to assume that synchronization between the first wireless earphone 110 and the second wireless earphone 120 have been lost.

In an embodiment, it is assumed that the first wireless earphone 110 and the second wireless earphone 120 are configured to synchronously play a specific audio (for example, sleep aid music) for the user to listen to, and the specific audio may be divided into an N number of audio segments (where N is a positive integer). In this case, the first wireless earphone 110 may, for example, take a time length of one of the N number of audio segments as the threshold value $T_{TH}$, but not limited thereto.

In an embodiment, in response to determining that the absolute time difference TD is greater than the threshold value $T_{TH}$ (i.e., $|T1-T2|>T_{TH}$), it means that the synchronization between the first wireless earphone 110 and the second wireless earphone 120 have been lost. In this case, the first wireless earphone 110 may determine that the synchronization state between the first wireless earphone 110 and the second wireless earphone 120 indicates that the first wireless earphone 110 is not synchronized with the second wireless earphone 120.

On the other hand, in response to determining that the absolute time difference TD is not greater than the threshold value $T_{TH}$ (i.e., $|T1-T2|\leq T_{TH}$), it means that the synchronization between the first wireless earphone 110 and the second wireless earphone 120 have not been lost. In this case, the first wireless earphone 110 may determine that the synchronization state between the first wireless earphone 110 and the second wireless earphone 120 indicates that the first wireless earphone 110 is synchronized with the second wireless earphone 120, but not limited thereto.

After that, in step S240, the first wireless earphone 110 adaptively corrects a play progress of playing the specific audio by the first wireless earphone 110 or by the second wireless earphone 120 according to the synchronization state between the first wireless earphone 110 and the second wireless earphone 120.

In an embodiment, in response to determining that the synchronization state between the first wireless earphone 110 and the second wireless earphone 120 indicates that the first wireless earphone 110 is not synchronized with the second wireless earphone 120, the first wireless earphone 110 may determine whether the first packet transception time difference T1 is greater than the second packet transception time difference T2.

In an embodiment, in response to determining that the first packet transception time difference T1 is greater than the second packet transception time difference T2, it means that the progress of playing the specific audio by the first wireless earphone 110 is relatively ahead. Therefore, the first wireless earphone 110 (i.e., the master earphone) may advance the play progress of playing the specific audio by the second wireless earphone 120 (i.e., the slave earphone) by a predetermined time length. In an embodiment, the predetermined time length may, for example, be equal to the time length of one of the N number of audio segments or the threshold value $T_{TH}$. In addition, in response to determining that the first packet transception time difference T1 is greater than the second packet transception time difference T2, the first wireless earphone 110 may also increase the system clock (e.g., the second system clock) of the slave earphone.

On the other hand, in response to determining that the first packet transception time difference T1 is not greater than the second packet transception time difference T2, it means that the progress of playing the specific audio by the first wireless earphone 110 is relatively behind. Therefore, the first wireless earphone 110 (i.e., the master earphone) may delay the play progress of playing the specific audio by the second wireless earphone 120 (i.e., the slave earphone) by the predetermined time length. In addition, in response to determining that the first packet transception time difference T1 is not greater than the second packet transception time difference T2, the first wireless earphone 110 may also decrease the system clock (e.g., the second system clock) of the slave earphone.

Therefore, the first wireless earphone 110 and the second wireless earphone 120 can accordingly be restored to synchronization to prevent the user from having an adversely affected auditory experience due to different speeds of music/sound effects heard by the two ears.

Moreover, in some embodiments, after adaptively correcting the play progress of playing the specific audio by the first wireless earphone 110 or by the second wireless earphone 120, the first wireless earphone 110 may also reset the first accumulated time AT1 and the second accumulated time AT2. In an embodiment, the first wireless earphone 110 may reset the first counter, and request the second wireless earphone 120 to reset the second counter, to achieve resetting the first accumulated time AT1 and the second accumulated time AT2, but not limited thereto.

In some embodiments, if the synchronization state obtained by the first wireless earphone 110 in step S230 indicates that the first wireless earphone 110 is synchronized with the second wireless earphone 120, the first wireless earphone 110 may also reset the first accumulated time AT1 and the second accumulated time AT2, but not limited thereto.

The first wireless earphone 110 may also transmit a third packet P3 to the second wireless earphone 120 during the $i^{th}$ period (i.e., the period $T_i$) of an embodiment. The third packet P3 records the first packet transception time difference T1 measured by the first wireless earphone 110 during the i-$1^{th}$ period (i.e., the period $T_{i-1}$).

In an embodiment, since the first wireless earphone 110 is assumed to be the master earphone, the third packet P3 is, for example, another data packet transmitted from the first wireless earphone 110. In this case, the first wireless earphone 110 may, for example, take the first accumulated time AT1 as the first packet transception time difference T1 in the third packet P3, and inform the second wireless earphone 120 of the first packet transception time difference T1 (i.e., the first accumulated time AT1) through the third packet P3.

In an embodiment, the first wireless earphone 110 may, for example, take the first packet transception time difference T1 as a payload in the third packet P3 to be transmitted to the second wireless earphone 120, but not limited thereto. In addition, during the process of transmitting the third packet P3 by the first wireless earphone 110, the first wireless earphone 110 may also record a second transmission completion time TT2' of the third packet P3. Moreover, the first wireless earphone 110 may obtain a transmission time difference $T_{i,1}$ between the first transmission completion time TT1' and the second transmission completion time TT2', and accumulate the transmission time difference $T_{i,1}$ to the first accumulated time AT1. In this case, the first wireless earphone 110 may provide the obtained first accumulated time AT1 to the second wireless earphone 120 through the corresponding data packet during the next period.

In an embodiment, after receiving the third packet P3, the second wireless earphone 120 may obtain the first packet transception time difference T1 from the third packet P3 to accordingly know the first accumulated time AT1. In addition, during the process of receiving the third packet P3 by the second wireless earphone 120, the second wireless earphone 120 may also record a second reception completion time RT2' of the third packet P3. After that, the second wireless earphone 120 may transmit a fourth packet P4 corresponding to the third packet P3 back to the first wireless earphone 110. Accordingly, the first wireless earphone 110 may receive the fourth packet P4 from the second wireless earphone 120.

In an embodiment, since the second wireless earphone 120 is assumed to be the slave earphone, the fourth packet P4 transmitted by the second wireless earphone 120 is, for example, an acknowledgement message corresponding to the third packet P3, and may record the second packet transception time difference T2 measured by the second wireless earphone 120 during the i-1$^{th}$ period (i.e., the period $T_{i-1}$).

Moreover, the second wireless earphone 120 may obtain a reception time difference T2 between the first reception completion time RT1' and the second reception completion time RT2', and accumulate the reception time difference T2 to the second accumulated time AT2. In this case, the second wireless earphone 120 may provide the obtained second accumulated time AT2 to the first wireless earphone 110 through the corresponding acknowledgement message during the next period.

Therefore, the first wireless earphone 110 and the second wireless earphone 120 may perform corresponding steps S210 to S240 again during the next period (i.e., a period $T_{i+1}$), to adaptively correct the play progress of playing the specific audio by the first wireless earphone 110 or by the second wireless earphone 120.

Furthermore, in an embodiment, the first data packet DP1, the acknowledgement message RP1, the second data packet DP2, and the acknowledgement message RP2 transmitted during the period $T_{i-1}$ may be respectively understood as the first packet, the second packet, the third packet, and the fourth packet transmitted during the period $T_{i-1}$. In other words, payloads of the first data packet DP1 and the second data packet DP2 may record the first accumulated time, and the acknowledgement messages RP1 and RP2 may record the second accumulated time, but not limited thereto.

In summary of the foregoing, in the true wireless earphone system provided by the embodiments of disclosure, the master earphone may transmit two data packets to the slave earphone during a certain period. In this case, the master earphone may determine a packet transception time difference based on the transmission completion times of the two data packets. In addition, the slave earphone may determine another packet transception time difference based on the reception completion times of the two data packets. After that, during the next period, the master earphone may inform the slave earphone of the measured packet transception time difference through the data packet, and the slave earphone may inform the master earphone of the measured another packet transception time difference through a corresponding acknowledgement message.

After that, the first wireless earphone (which may be the master earphone or the slave earphone) may determine the synchronization state between the first wireless earphone and the second wireless earphone according to the obtained packet transception time difference and another packet transception time difference, and accordingly correct the play progress of playing the specific audio by the first wireless earphone or by the second wireless earphone.

Therefore, the first wireless earphone 110 and the second wireless earphone 120 can accordingly be restored to synchronization to prevent the user from having an adversely affected auditory experience due to different speeds of music/sound effects heard by the two ears.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A true wireless earphone system, comprising:
   a first wireless earphone configured to, during an i$^{th}$ period:
   send a first packet to a second wireless earphone, wherein the first packet records a first packet transception time difference measured by the first wireless earphone during an i-1$^{th}$ period, where i is an index value;
   receive a second packet from the second wireless earphone, wherein the second packet records a second packet transception time difference measured by the second wireless earphone during the i-1$^{th}$ period;
   obtain a synchronization state between the first wireless earphone and the second wireless earphone according to the first packet transception time difference and the second packet transception time difference; and
   adaptively correct a play progress of playing a specific audio by the first wireless earphone or by the second wireless earphone according to the synchronization state between the first wireless earphone and the second wireless earphone.

2. The system of claim 1, wherein the first wireless earphone is further configured to, during the i$^{th}$ period:
   send a third packet to the second wireless earphone, wherein the third packet records the first packet transception time difference measured by the first wireless earphone during the i-1$^{th}$ period; and
   receive a fourth packet from the second wireless earphone, wherein the fourth packet records the second packet transception time difference measured by the second wireless earphone during the i-1$^{th}$ period.

3. The system of claim 1, wherein the first wireless earphone comprises a master earphone in the true wireless earphone system, and the first wireless earphone is further configured to, during the i-1$^{th}$ period:
   send a first data packet to the second wireless earphone, and record a first transmission completion time of the first data packet;

send a second data packet to the second wireless earphone, and record a second transmission completion time of the second data packet;

obtain a transmission time difference between the first transmission completion time and the second transmission completion time, and accumulate the transmission time difference to a first accumulated time; and take the first accumulated time as the first packet transception time difference in the first packet.

4. The system of claim 3, further comprising the second wireless earphone, wherein the second wireless earphone is a slave earphone in the true wireless earphone system, and the second wireless earphone is further configured to, during the i-1$^{th}$ period:

receive the first data packet from the first wireless earphone, and record a first reception completion time of the first data packet;

receive the second data packet from the first wireless earphone, and record a second reception completion time of the second data packet;

obtain a reception time difference between the first reception completion time and the second reception completion time, and accumulate the reception time difference to a second accumulated time; and take the second accumulated time as the second packet transception time difference in the second packet.

5. The system of claim 3, wherein the first wireless earphone determines the first transmission completion time of the first data packet based on a first interruption time point corresponding to a first transmission interruption signal of the first data packet, and determines the second transmission completion time of the second data packet based on a second interruption time point corresponding to a second transmission interruption signal of the second data packet.

6. The system of claim 1, wherein the first wireless earphone is configured to:

obtain an absolute time difference between the first packet transception time difference and the second packet transception time difference;

determine that the synchronization state indicates that the first wireless earphone is not synchronized with the second wireless earphone in response to determining that the absolute time difference is greater than a threshold value; and determine that the synchronization state indicates that the first wireless earphone is synchronized with the second wireless earphone in response to determining that the absolute time difference is not greater than the threshold value.

7. The system of claim 6, wherein the specific audio is divided into an N number of audio segments, and the threshold value is equal to a time length of one of the N number of audio segments, where N is a positive integer.

8. The system of claim 1, wherein the first wireless earphone is a master earphone of the true wireless earphone system, the second wireless earphone is a slave earphone of the true wireless earphone system, and the first wireless earphone is configured to:

determine whether the first packet transception time difference is greater than the second packet transception time difference in response to determining that the synchronization state indicates that the first wireless earphone is not synchronized with the second wireless earphone;

advance the play progress of playing the specific audio by the slave earphone by a predetermined time length in response to determining that the first packet transception time difference is greater than the second packet transception time difference; and delay the play progress of playing the specific audio by the slave earphone by the predetermined time length in response to determining that the first packet transception time difference is not greater than the second packet transception time difference.

9. The system of claim 8, wherein the first wireless earphone is further configured to:

increase a system clock of the slave earphone in response to determining that the first packet transception time difference is greater than the second packet transception time difference; and decrease the system clock of the slave earphone in response to determining that the first packet transception time difference is not greater than the second packet transception time difference.

10. The system of claim 1, wherein the first packet transception time difference corresponds to a first accumulated time accumulated by the first wireless earphone, the second packet transception time difference corresponds to a second accumulated time accumulated by the second wireless earphone, and the first wireless earphone is further configured to:

reset the first accumulated time and the second accumulated time after adaptively correcting the play progress of playing the specific audio by the first wireless earphone or by the second wireless earphone.

11. The system of claim 1, wherein the first packet transception time difference corresponds to a first accumulated time accumulated by the first wireless earphone, the second packet transception time difference corresponds to a second accumulated time accumulated by the second wireless earphone, and the first wireless earphone is configured to:

reset the first accumulated time and the second accumulated time in response to determining that the synchronization state indicates that the first wireless earphone is synchronized with the second wireless earphone.

12. An earphone synchronization method adapted for a true wireless earphone system comprising a first wireless earphone, the method comprising:

transmitting a first packet to a second wireless earphone by the first wireless earphone during an i$^{th}$ period, wherein the first packet records a first packet transception time difference measured by the first wireless earphone during an i-1$^{th}$ period, where i is an index value;

receiving a second packet from the second wireless earphone by the first wireless earphone during the i$^{th}$ period, wherein the second packet records a second packet transception time difference measured by the second wireless earphone during the i-1$^{th}$ period;

obtaining a synchronization state between the first wireless earphone and the second wireless earphone by the first wireless earphone according to the first packet transception time difference and the second packet transception time difference; and adaptively correcting, by the first wireless earphone, a play progress of playing a specific audio by the first wireless earphone or by the second wireless earphone according to the synchronization state between the first wireless earphone and the second wireless earphone.

* * * * *